J. H. GLAUBER.
COUPLING PIPE FOR BATH TUBS, BASINS, AND LIKE VESSELS.
APPLICATION FILED AUG. 17, 1908.

1,107,289.

Patented Aug. 18, 1914.

ATTEST.
E. M. Fisher
F. C. Mussun.

INVENTOR.
JOSEPH H. GLAUBER.
By Fisher & Wood ATTYS.

UNITED STATES PATENT OFFICE.

JOSEPH H. GLAUBER, OF CLEVELAND, OHIO.

COUPLING-PIPE FOR BATH-TUBS, BASINS, AND LIKE VESSELS.

1,107,289.

Specification of Letters Patent.   Patented Aug. 18, 1914.

Application filed August 17, 1908. Serial No. 448,771.

*To all whom it may concern:*

Be it known that I, JOSEPH H. GLAUBER, a citizen of the United States, residing at Cleveland, in the county of Cuyahoga and State of Ohio, have invented certain new and useful Improvements in Coupling-Pipes for Bath-Tubs, Basins, and like Vessels, and do declare that the following is a full, clear, and exact description of the invention, which will enable others skilled in the art to which it appertains to make and use the same.

My invention relates to coupling pipes for lavatory receptacles such as wash tubs, basins and like vessels, and the invention consists of a single unitary coupling member constituting a new and novel article of manufacture and sale, and which, together with sundry attachments provides a new and novel means for connecting the faucets of lavatory receptacles with the iron service pipes which deliver the water under pressure to the lavatory receptacles, all as hereinafter described and more particularly pointed out in the claims.

In the main, the object of my invention is to provide a single unitary coupling member universally applicable to existing conditions and which may be adjustably secured to the service pipe and directly attached to the main body of a faucet to support the same within and upon a bath tub or like vessel and which coupling member is without separable joints open to the water supply between its ends.

Figure 1:
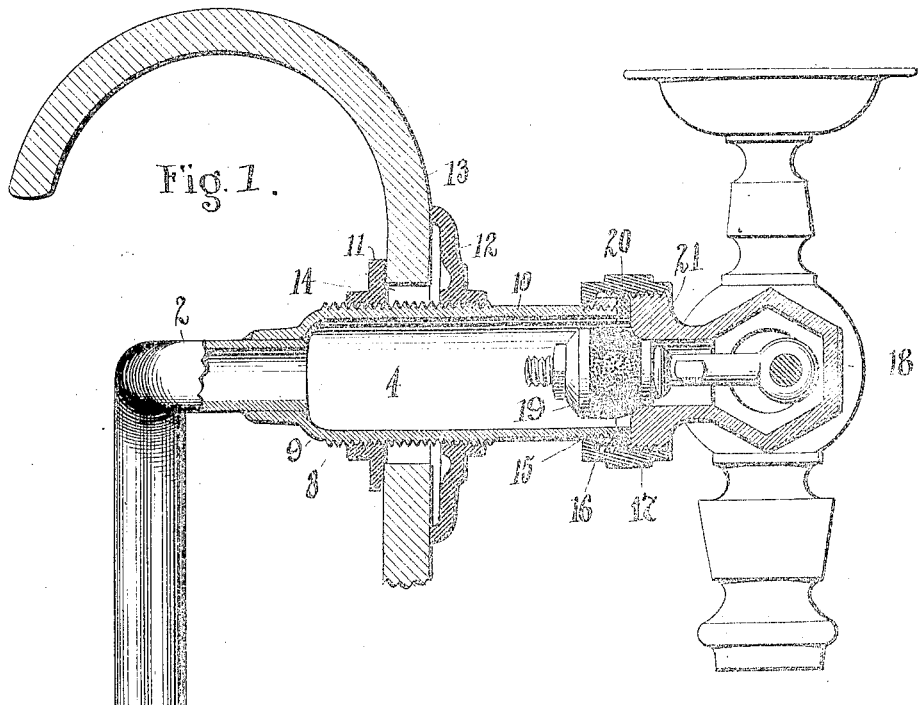
Figure 2:
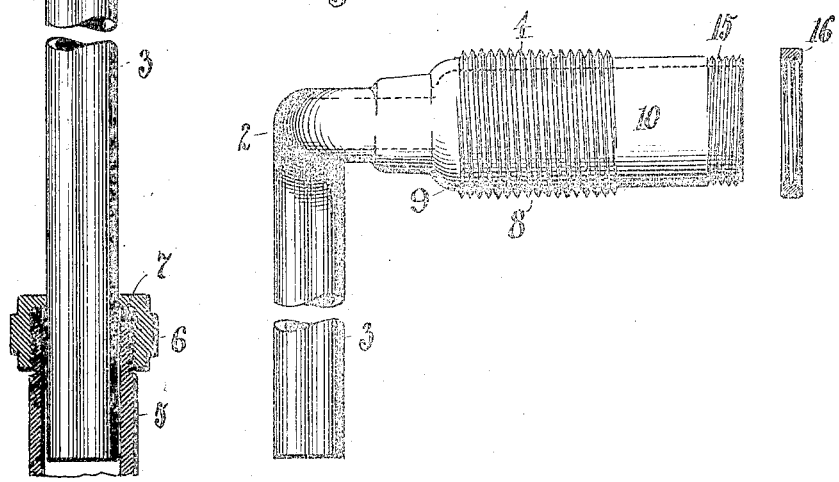

In the accompanying drawings, Figure 1 is a side elevation and sectional view of my coupling member having a faucet connected thereto and attached to a bath-tub and service pipe, the vertical portion of the coupling member being broken away and foreshortened to illustrate the service pipe end on the same sheet. Fig. 2 is a side elevation of my improved coupling member with the leg portion broken away and foreshortened.

The coupling member in its entirety is represented by 2 and is a single, unitary tubular member comprising a relatively long leg portion or pipe 3 with a short tubular shank 4 of greater diameter extending at substantially right angles to said leg or pipe. The outer diameter of leg or pipe 3, especially the lower portion thereof, is preferably smaller than the interior diameter of the smallest service pipes 5 found in general use, and is preferably of smooth exterior to permit the coupling member to be telescoped therein more or less for adjustments vertically. A water-tight slip joint and adjustable connection between pipe portion 3 and the service pipe is obtained by a slip nut 6 sleeved upon said pipe portion and having threaded engagement with service pipe 5, a suitable gasket or washer 7 also being used. Where the service pipe 5 varies in size or in form of thread, a corresponding variation occurs in nut 6, substitution of one for another being had.

Shank 4 is enlarged in diameter both inside and out relatively to the leg or pipe portion 3, and in one form is a separate member sleeved over the end of the pipe but made an inseparable and unitary part therewith by soldering or welding them together. However, both leg 3 and shank 4 may be formed from a single piece of tubing. In either case the leg portion and the shank are associated together by means of an integral and non-detachable union in the sense that there is no detachable connection between the two. The shank 4 itself is of one piece, in the sense that in its finished state it is free from any detachable connection between its ends. It may also be of uniform diameter, as illustrated in the drawings. A coarse thread 8 over the exterior rear end of shank 4 extends from rounded portion 9 to a smoothly finished and reduced neck 10, and a lock nut 11 and screw flange 12 are screwed upon this thread to adjustably secure and clamp the shank member in place upon the rear wall of bath-tub 13 when shank 4 is inserted and extends through opening 14 in said wall. This insertion may be done either from the rear and outside of the tub, or from the front and inside, the coupling member being of less diameter throughout its length than the aperture in the wall of the bath tub or other receptacle with which the coupling member is to be employed. To facilitate attachment of the coupling member to the tub and the faucet to the coupling member, shank 4 is provided with a fine exterior thread 15 at its immediate front end with which a threaded collar or ring 16 is removably engaged. This ring 16 provides a holding flange or engaging collar for coupling nut 17 of faucet 18. Thus, when shank 4 is inserted through opening 14, its screw flange member 12 must first of all be removed if said shank is introduced from the rear and outside of the tub, and by removing collar or ring 16, member 12 may be removed and the shank brought to place and finally clamped when screw flange member 12 is replaced. With a removable collar or ring 16, it is also entirely practicable and advantageous to bring a faucet or bath cock of any kind or make with its own coupling nut to the tub and attach the same to the coupling member without disturbing the clamped connection of the latter with the tub. This is accomplished by unscrewing the ring or collar 16 from the end of the shank, slipping the coupling nut of the faucet over the shank, replacing the threaded ring, and finally screwing the coupling nut on to the spud of the faucet to clamp the faucet in position. This arrangement also permits of a worn out or broken faucet being removed and another one substituted without removing or disturbing the coupling member even though the substituted faucet requires a different form of coupling nut.

The inner diameter of tubular shank 4 is and must be sufficiently large to accommodate the ball valve 19 of faucet 18 of the kind shown to permit the free outflow of water about the same when the valve is opened. A suitable gasket or washer 20 may be employed between the threaded end 21 of the faucet and the end of the shank and its ring 16 to make a water tight connection when the coupling nut secures the said parts together. It will be here noted that the only separable joints or detachable connections in the line of water supply to the tub are made at the lower end of the pipe portion 3 at service pipe 5 where direct slip connection is made by nut 6, and at the front end of shank 4 where direct fixed connection is made to faucet 18 by coupling nut 17. Thus, there are no other joints to leak in the whole service connection inside or outside of the tub. This feature is of decided advantage and is distinctly provided for by my single, integral unitary coupling member adapted to make direct connections at its respective ends with the service pipe and with the main faucet body, respectively. Other advantages of my improved coupling member will perhaps be better understood by reference to the following conditions to be met with in installing bath-tubs and like vessels. Thus, it is a customary practice when equipping a building with bath-tubs, to install the service pipes in the vicinity of one end of the bath-tub with their threaded ends 5 projecting vertically upward through the floor, and these pipes are usually permanently placed before the tubs are delivered on the premises. When the tubs are subsequently delivered and put in place, some suitable water tight connection is provided which is adapted to resist high water pressure between the threaded ends of the service pipes and the threaded ends of the separable spuds of the bath cocks. In making these connections there are many varying factors which have to be taken into consideration: for instance, the diameter and the number of threads to the inch may vary in the spuds of the different makes of bath cocks, and the angle of the flared or conical seat for the taper joint also varies in the different makes. The diameter of the service pipe and number of threads to the inch thereon also vary, as it is customary to use different sizes of pipes according to conditions. Again, the vertical distance between the end of the bath-cock and the top of the service pipe varies, not only on account of the different distances which the service pipe may project through the floor, but on account of the different heights of bath-tubs which have the faucet at greater or less distance above the floor. Then again, the tub is often placed in crowded quarters and is set at different distances from the service pipe which necessarily varies the horizontal distance between the ends of the service pipes and the spuds of the bath cocks when installed and which variations must be met in the means of attachment or in the coupling pipe itself. Heretofore these conditions in making the connection between the faucet spud and the service pipe have been met by employing various devices comprising built-up supply pipes and couplings of many parts, and all known to me have separable joints and connections open to the water supply between their main connections with the faucet and the service pipe.

The usual practice heretofore has been to provide a separable connection or joint between the shank which passes through the hole in the bath tub and the supply pipe which connects the shank with the service pipe, this joint being located outside of the tub. In another instance of which I am aware a supply pipe passes through the opening in the wall of the tub, and a separable connecting sleeve for the attachment of the faucet is provided, being detachably connected to the supply pipe within the tub and adjacent to the tub opening. In this latter construction this connecting sleeve is necessarily detachable in order to permit of the removal and restoring of the clamping nuts for securing the pipe to the tub in installing the fixture, and in order to enable the faucet to be put on or replaced. Thus in one instance there is a separable joint in the fixture between the service pipe and the faucet, outside of the tub, and in the other there is a separable joint inside the tub. In no instance prior to my invention, so far as I am aware, has a coupling member been provided which is entirely free from separable joints, both without and within the tub, between the point where connection is made with the service pipe on the one hand and the point where connection is made with the faucet on the other hand. Now, in contradistinction to the prior art, my new and improved coupling member 2 provides a single unitary structure of universal applicability, wherein no detachable or separable joint or connection is embodied in the coupling itself either in the pipe or leg portion or in the shank portion or between these portions; in other words, there is no detachable connection or joint of any kind in the coupling member either inside or outside of the tub between the main body of the faucet and the service pipe. There are but two detachable joints in the entire system, one between the coupling member and the service pipe and the other between the coupling member and the faucet body; thereby disposing of every preëxisting trouble and annoyance, such as leakage, making needless attachments and adjustments, etc., as found in jointed and built-up supply pipes.

The shanks, thimbles or tail pieces of the faucets in general use are invariably made of cast metal and the supply pipes are usually made of tubing, and said cast parts are separable from the tubing and from the faucet body. My unitary construction lends itself to the use of tubing from end to end, including the portion which serves as a faucet shank, thus reducing the cost of manufacture, and producing a superior article which is free from sand-holes and other defects so often found in cast connections or parts, and permitting the article to be made soft, or annealed, and flexible in part or in its entirety for easy bending of the pipe without injury to it and to provide for all the variations referred to in installing the tub and making service connections.

One advantage of my coupling member is that its use does not depend solely upon the sealing effect of any threads to make a water tight connection but instead, is provided with nuts 6 and 17, respectively, which make comparatively loose engagement at the threaded end of the service pipe and threaded body portion of the bath cock, it being only essential that the engagement shall be sufficient to spread the gaskets used therewith and compress them securely between the coupling member and the service pipe or faucet body, as the case may be, to make a water tight joint. This also provides adjustability without leakage for the end of the pipe or leg portion 3 which is adapted to telescope into the service pipe and whereby connections of varying lengths can be made. The other end of the coupling member, that is, the shank is provided with an annular collar which, as shown in Fig. 2, is detachable to provide for engagement of the coupling nut to make connection with the faucet body.

With this construction I am enabled to furnish the trade and the public with a faucet and coupling member combined complete, or I am enabled to send the coupling member, without the faucet 18 and without the coupling nut 17 to the trade in a form which enables the plumber to connect the same to the various makes of faucets on the market, the plumber supplying the usual coupling nut which always accompanies the faucet to complete the connection between the faucet body and the coupling member. Then if the plumber so desires he may install my improved member by inserting the same through the tub aperture from the inside of the tub. Thus, the nut 17 and screw flange 12 may be sleeved over the coupling member and placed upon shank 4, and the coupling member may then be inserted through aperture 14 of the tub 13. Then the lock-nut 11 and the connecting nut 6 and gasket 7 for the service pipe are sleeved over pipe or leg 3 and the structure is ready to be connected with both service pipe 5 and faucet 18. However, if the amount of room is limited for making the connection, a great advantage will be found by reason of the attachable and detachable ring or collar 16, which permits the coupling member to be installed and connected with the service pipes before the tub or fixture is placed in position. Thus, by reason of the said removable ring or collar, the lock-nut 11 and connecting nut 6 and its gasket may be adjusted first, the coupling member installed upon the service pipe 5, the tub set in position next, and the screw flange 12 and coupling nut 17 sleeved upon shank 4 last. The ring or collar 16 is then attached, the gasket 20 inserted and the structure is ready for connection with the faucet or fixture 18. This last method of connection is frequently found desirable, because, in many instances, the tubs are often backed very close to the wall, allowing but little room for connections to be made, and the final connections can be made from the inside of the tub without restrictions or interference. Thus owing to the fact that the coupling member is of less diameter throughout its length than the aperture in the wall of the bathtub or other receptacle, and that the collar 16, screw flange 12, lock nut 11 and nut 6 are removable, as described, the coupling pipe is adapted to be installed either from the inside or the outside of the tub. In the former case, the nut 6 and lock nut 11 are removed and the leg portion 3 of the coupling member passed through the tub aperture from the inside of the tub, and the lock nut and nut 6 then placed on the coupling member and adjusted in position. In the latter case, the collar 16 and screw flange 12 are removed and the shank end of the coupling member passed through the aperture, or, what amounts to the same thing, the tub at its aperture is sleeved over the shank portion, and then the members 12 and 16 are adjusted in position. The device is therefore of a universal character, in that it is capable of being installed in position from either side of the wall of the receptacle.

It will be understood that the pipe or leg portion 3 is preferably of such soft bendable material that it is a comparatively easy matter to bend or flex the pipe or leg in installing same to meet varying conditions. Either a double or single curve or bend may be made in the pipe or leg at its juncture with shank 4 and it often occurs that leg 3 is eventually curved substantially its full length. As sent to the trade, however, leg 3 is straight excepting the bend or bends near the shank portion.

Faucet 18, as shown, represents a so-called Fuller bath cock, but a compression bath cock may be used instead, in which event the coupling member 2 may be of the same diameter from end to end, or merely reduced at the intake end of leg 3. Any equivalent means for making an attachable and detachable connection for collar 16 may be employed in place of the threaded connection shown.

What I claim is:—

1. A new article of manufacture for connecting a service pipe with the faucet of a lavatory receptacle, consisting of an integral coupling member of less diameter throughout its length than the aperture in the wall of the receptacle, whereby the coupling member may be installed by inserting it through the aperture from either side of the wall of the receptacle, and comprising a shank portion threaded where it passes through the aperture and a leg portion adapted for attachment to the service pipe, the coupling member being reduced in diameter beyond the ends of the said threaded portion, threaded clamping members adapted to be slipped over the opposite ends of the coupling member and into engagement with the said threaded portion of the shank to clamp the coupling member to the wall of the receptacle, and means associated with the shank portion to attach a faucet thereto.

2. A new article of manufacture for connecting a service pipe with the faucet of a lavatory receptacle, consisting of an integral coupling member of less diameter throughout its length than the aperture in the wall of the receptacle and comprising a shank portion to extend through the aperture and an angularly disposed leg portion adapted for attachment to the service pipe, and independently removable clamping members associated with the coupling member to engage the opposite sides of the wall of the receptacle.

In testimony whereof I sign this specification in the presence of two witnesses.

JOSEPH H. GLAUBER.

Witnesses:
 R. B. MOSER,
 F. C. MUSSUN.